Aug. 23, 1932.  W. D. DEWEND  1,873,307
DISK HARROW SCRAPER
Filed Jan. 13, 1930   2 Sheets-Sheet 2
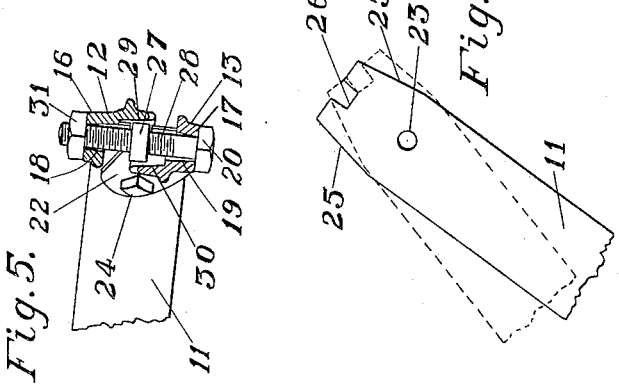
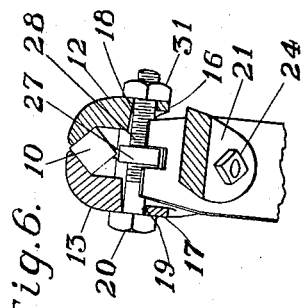
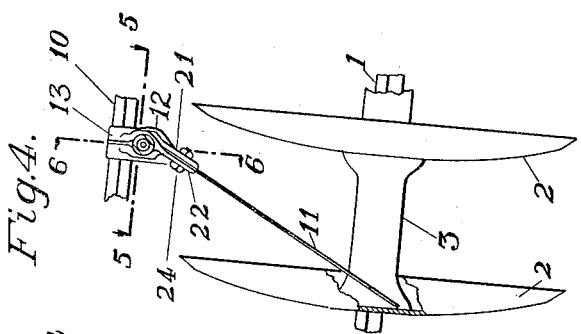
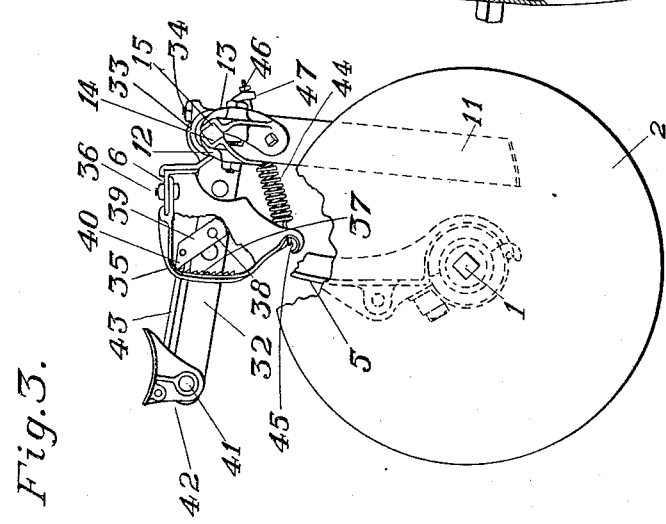
INVENTOR.
William D. Dewend
BY John P. Smith
ATTORNEYS.

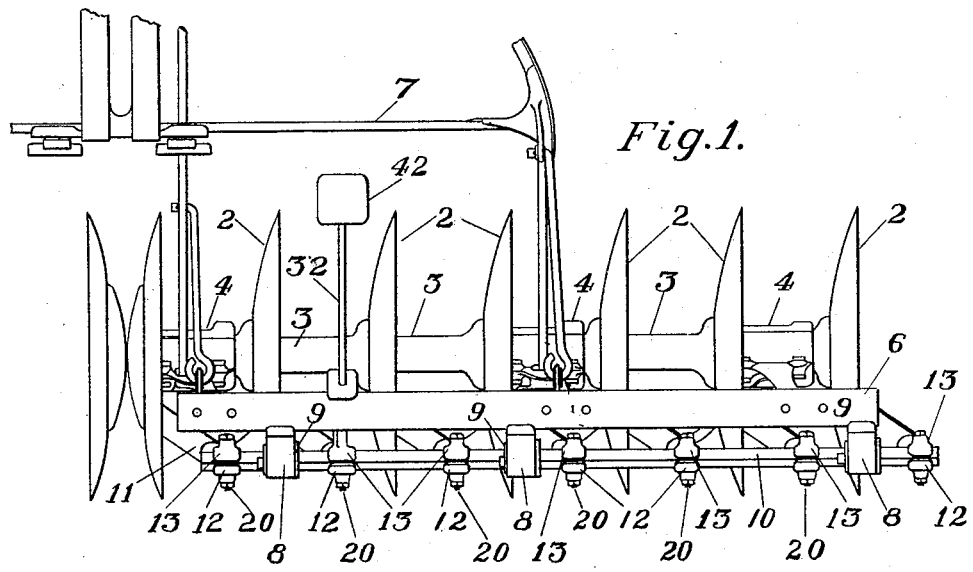
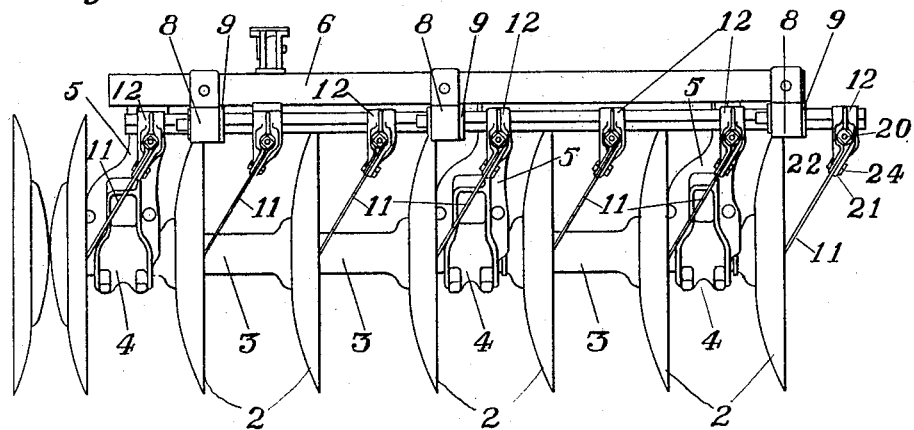

Patented Aug. 23, 1932

1,873,307

UNITED STATES PATENT OFFICE

WILLIAM D. DEWEND, OF SOUTH BEND, INDIANA, ASSIGNOR TO OLIVER FARM EQUIPMENT COMPANY, A CORPORATION OF DELAWARE

DISK HARROW SCRAPER

Application filed January 13, 1930. Serial No. 420,388.

This invention relates to improvements in agricultural implements of the disk type, and more particularly to the means for regulating, controlling and adjusting the scrapers for disk blades of such implements as disk harrows.

One of the primary objects of the present invention is to provide a novel and improved form of individual adjustment for each scraper so that the same may be adjusted with respect to each individual disk.

A further object of the invention is to provide a novel and improved individual adjustment of each scraper so that the same may be properly positioned with respect to the disk to overcome any variation in the various parts or in case the scraper shaft becomes twisted during its normal operation of the field.

A still further object of the invention is to provide a novel and improved form of individual adjustment together with a simultaneously controlled scraping mechanism for disk harrows, so that if it becomes necessary to adjust the individual scrapers to accommodate various spools having different bell portion diameters, this may be accomplished with considerable ease and facility.

These and other objects are accomplished by providing a construction and an arrangement of the various parts in the manner hereinafter described and particularly pointed out in the appended claims.

Referring to the drawings,

Fig. 1 is a top plan view of a portion of a disk harrow showing my invention embodied therein.

Fig. 2 is a rear elevational view of the harrow shown in Fig. 1.

Fig. 3 is an enlarged fragmentary side elevational view.

Fig. 4 is an enlarged detail rear elevational view.

Fig. 5 is an enlarged cross sectional view taken on the line 5—5 of Fig. 4.

Fig. 6 is a cross sectional view taken on the line 6—6 of Fig. 4; and

Fig. 7 is an enlarged detail view of the scraper blade illustrating two extreme positions from the full line position to the dotted line position to which the blade may be adjusted with respect to the axial center of the disk.

The invention herein described and illustrated in the drawings is an improvement over the construction described and claimed in my United States Letters Patent No. 1,472,209, dated October 30, 1923. The construction disclosed and described in this patent is directed to a construction for the simultaneous adjustment of a plurality of scrapers with respect to the disk blades of the harrow through the manipulation of the foot lever mechanism, while the invention disclosed in the present instance is directed to a novel and improved construction for the individual adjustment of the scrapers with respect to their cooperating disks.

The present invention permits the individual adjustment of the scraper with respect to its respective disk, and is especially advantageous when the scrapers do not properly line up after being assembled due to variation in the several parts, or in cases where the scraper shaft had become twisted in its normal operation in the field. This individual adjustment is also especially desirable when the use of spacing spools between the disk blades are provided with end bell portions of different diameters, so that each scraper may be individually adjusted to accommodate the particular size spool used adjacent the disk.

In illustrating one embodiment of my invention, I have shown the same in connection with a disk harrow or gang unit thereof which comprises a shaft 1 on which earth working members made in the form of disk blades 2 are mounted and slidably spaced apart by sleeves or spools 3 and 4, the latter being flanged and adapted to have the lower end portion of standards 5 secured to them. A horizontal angle beam 6 is secured to the upper end of the standard 5 and extends approximately from end to end of the harrow or gang unit. The standards 5 and beam 6 thus constitute a harrow or gang unit frame, and to such frame a suitable draft frame such as generally indicated at 7 is connected.

Brackets 8 are secured to the angle beam 6 and project rearwardly therefrom, said brackets having bushings 9 mounted therein to provide bearings for a scraper shaft 10 preferably angular in cross section, and to this shaft scrapers 11 are adjustably secured by a forward and rearward clamping member 12 and 13 respectively. The upper ends of each of these clamping members 12 and 13 are provided with substantially angular sockets 14 and 15 so as to form therebetween a substantially square socket for receiving therein and clamping therebetween the square scraper shaft 10, as clearly shown in Fig. 3. Each of the clamping brackets are provided with aligned bosses 16 and 17 respectively, which in turn are provided with longitudinally extending aligned bores 18 and 19 for the reception of a bolt 20 for clamping the brackets to the shaft. The clamping member 12 is provided with an angularly and laterally inclined ear 21 and the bracket 13 is provided with a similarly inclined ear 22 disposed in parallel and spaced relation with respect to the ear 21 for receiving and clamping therebetween the scraper blade 11. The scraper 11 is provided with an aperture 23 which is adapted to receive a bolt 24 which extends through registering apertures in the ears 21 and 22, in each of the clamping brackets 12 and 13 for securing the scraper 11 therebetween. The upper end of the scraper 11 is tapered on both sides as shown at 25, and is provided with a substantially cut out or notch portion 26, which is substantially rectangular in form and is adapted to engage a nut 27 mounted in threaded engagement with an extended threaded portion 28 of the bolt 20. The nut 27 is held against rotation when the head of the bolt 20 is turned by means of inwardly extending walls 29 and 30 formed integrally with the bosses 16 and 17 of the respective clamping members 12 and 13. The bolt 20 is provided with the usual threaded nut 31.

From the above description it will be seen that if an attendant is desirous of adjusting the scraper 11 relative to the axial centers of the disks, the nut of the bolt 24 may be slightly loosened after which the nut 31 may be partially unscrewed from the bolt 20. When this has been done, the head of the bolt 20 may then be revolved, during which operation the nut 27 mounted intermediate the ends of the bolt 20 will be moved relative to the head of the bolt, and by reason of the nut 27 engaging the notch 26 formed on the upper end of the scraper 11, the scraper will be moved about its pivot on the bolt 24 until the desired adjustment of the scraper is attained, thereby permitting the individual scraper to be adjusted with respect to the axial center of its respective disk. This arrangement permits the scraper to be adjusted so that any variation in the manufacture of the several parts may be readily taken care of or adjustment may be made of the individual scraper in the event the scraper shaft becomes twisted in its normal operation in the field.

In the manner described in my previously mentioned patent, all the scrapers 11 connected to the scraper shaft 10 are simultaneously controlled by a foot lever generally indicated by the reference character 32, which in turn has one end thereof rigidly secured to the scraper shaft 10 by means of a clamping bracket 33 (only a part of which is shown) and bolt 34. The free end of the lever 32 is adapted to oscillate within a bracket 35 secured to the horizontal portion of the beam 6 by means of bolts 36. This bracket 35 is provided with a plurality of ratchet teeth 37 arranged in the arc of a circle whose center is substantially the axis of the scraper shaft 10. Pivotally mounted on the lever 32 as shown at 38, is a pawl 39 which has its free end pointed as shown at 40, and adapted for engagement with the teeth 37 on the bracket 35. Pivotally mounted on the free end of the lever 32 by means of the pin 41 is a foot pedal lever 42 which is operatively connected by means of a connecting rod 43 to the pawl 39 as clearly shown in Fig. 3. The lever 32 is urged upwardly in a clockwise direction when looking at Fig. 3, and the scraper shaft 10 is urged in a similar direction, causing the scrapers 11 to revolve toward the axial centers of the disks 2 by means of an extension spring 44, which has one end thereof connected to a forwardly curved hook portion 45 formed on the lower end of the bracket 35, and the other end thereof connected to a hook bolt 46 extending through an ear 47 formed on one of the lower clamping members 33.

With the construction and arrangement of the parts above described, it will be noted that a downward pressure exerted on the front edge of the pedal 42 tends to force the foot lever downwardly, thereby causing all of the scrapers 11 to simultaneously swing or oscillate toward the outer peripheral edges of the disk blades 2. This same movement of the pedal operates to force the pawl 40 into engagement with the teeth 37 on the bracket 35, so that during the downward movement of the foot lever, the pawl will be caused to move over the ratchet teeth 37, and may be permitted to become locked at any desired position by simply removing the pressure from the foot lever. It will be further noted that by reason of the spring 44 exerting a force tending to move the foot lever upwardly, the pawl to remain in engagement with the ratchet teeth and the scrapers will be held locked in position. Pressure on the rear edge of the pedal 42 will cause the same to rock in a direction to transmit motion through the rod 43 to the pawl 40 for releasing the pawl from the ratchet teeth 37, and thus permit all the scrapers 11 to move simultaneously toward the center of the disks 2 by the action of the spring. This construction is described more in detail in my patent aforementioned, and I believe that a more detailed description of the same is unnecessary, because this construction per se does not form a part of the present invention except in the combination with the novel features herein described.

While in the above specification I have described one embodiment which my invention may assume in practice, it will of course be understood that the same is capable of modification, and that modification may be made without departing from the spirit and scope of my invention as expressed in the following claims:

What I claim as my invention and desire to secure by Letters Patent is:

1. In an agricultural implement, the combination with a plurality of soil engaging disks and means for mounting the same, of a plurality of scrapers for said disks, means connected with said scrapers for simultaneously adjusting said scrapers with respect to said disks, and means engageable with said scrapers for individually adjusting said scrapers with respect to its cooperating disk.

2. In an agricultural implement, the combination with a frame and a disk gang, of a shaft mounted on said frame, scrapers secured to said shaft for scraping said disks, a lever secured to said shaft for simultaneously adjusting said scrapers, and means individual to each scraper for adjusting each scraper with respect to the axis of its respective disk.

3. In an agricultural implement, the combination with a frame and a disk gang, of a shaft mounted on said frame, scrapers secured to said shaft for simultaneous adjustment therewith, a lever for adjusting said shaft, a ratchet locking mechanism mounted on said frame and adapted to cooperate with said lever for locking said scrapers in various positions of adjustment, a clamping mechanism for clamping each scraper to said scraper shaft, and means carried by each clamping mechanism for individually adjusting said scraper with respect to its cooperating disk.

4. In an agricultural implement, the combination with a frame and a plurality of disks carried by said frame, of an oscillating shaft carried by said frame, scrapers secured to said shaft and adapted to cooperate with each disk, means for simultaneously adjusting said scrapers with respect to their adjacent disks, and means individual to each scraper for independently adjusting each scraper with respect to its cooperating disk.

5. In an agricultural implement, the combination with a frame and a plurality of soil engaging disks, of an oscillatory shaft mounted on said frame, means for adjusting said shaft, a plurality of disk scrapers each connected to said shaft and adapted to cooperate with an adjacent disk, clamping members secured to said shaft forming the support for said scrapers, and means mounted on said clamping members for individually adjusting said scrapers with respect to said disks.

6. In an agricultural implement, the combination with a frame, a plurality of disks carried by said frame, a shaft secured to said frame, clamping brackets secured to said shaft, scrapers pivoted to said clamping brackets, and means carried by said clamping members and engageable with said scrapers for individually adjusting said scrapers about the pivot on said clamping members whereby each of said scrapers may be independently adjusted with respect to its cooperating disk, and means mounted on said frame for simultaneously adjusting all of said scrapers with respect to said disks.

7. In an agricultural implement, the combination with a frame, a plurality of disks carried by said frame, a shaft secured to said frame, clamping brackets secured to said shaft, scrapers pivoted to said clamping brackets, and means for securing said clamping brackets to said shaft and engageable with said scrapers for individually adjusting said scrapers with respect to their respective disks.

8. In an agricultural implement, the combination with a frame, and a plurality of soil engaging disks, of an oscillatory shaft mounted on said frame, means for securing a plurality of scrapers to said shaft, and an adjustable bolt carried by said securing means for individually adjusting said scrapers with respect to their respective disks.

9. In an agricultural implement, the combination with a frame having a plurality of disks, of an oscillatory shaft mounted on said frame, clamping members secured to said shaft, scraper members adjustably secured to said clamping members, and bolts for securing said clamping members together, said bolts being operatively related to said scrapers whereby said scrapers may be adjusted with respect to the axis of said disks.

In testimony whereof I have signed my name to this specification, on this 9th day of January, A. D. 1930.

WILLIAM D. DEWEND.